United States Patent [19]

Reynaert

[11] Patent Number: 4,943,685
[45] Date of Patent: Jul. 24, 1990

[54] CABLE SPLICING AND TERMINATION SYSTEM

[75] Inventor: Edward A. Reynaert, Sanford, Mich.

[73] Assignee: Commu-Tec, Inc., Marion, N.C.

[21] Appl. No.: 324,699

[22] Filed: Mar. 17, 1989

[51] Int. Cl.⁵ .................. H02G 15/22; H02G 15/24
[52] U.S. Cl. .................... 174/19; 174/21 R; 174/76; 174/84 R
[58] Field of Search ............ 174/19, 21 R, 76, 84 R

[56] References Cited

U.S. PATENT DOCUMENTS

| 3,297,819 | 1/1967 | Wetmore | 174/21 R |
|---|---|---|---|
| 3,879,575 | 4/1975 | Dobbin et al. | 174/76 X |
| 4,056,680 | 11/1977 | Aihara et al. | 174/19 |
| 4,060,583 | 11/1977 | Groves et al. | 174/19 X |
| 4,225,746 | 9/1980 | Ball | 174/21 R X |
| 4,281,210 | 7/1981 | Brauer et al. | 174/23 C |
| 4,477,376 | 10/1984 | Gold | 174/76 X |
| 4,701,016 | 10/1987 | Gartside, III et al. | 174/70 R X |
| 4,709,982 | 12/1987 | Corne et al. | 174/23 C X |
| 4,721,832 | 1/1988 | Toy | 174/76 X |
| 4,741,940 | 3/1988 | Reed | 174/76 X |
| 4,756,851 | 7/1988 | Billigmeier et al. | 174/23 C X |
| 4,764,232 | 8/1988 | Hunter | 174/76 X |

FOREIGN PATENT DOCUMENTS

| 2105892 | 9/1972 | Fed. Rep. of Germany | 174/76 |
|---|---|---|---|
| 2730555 | 1/1978 | Fed. Rep. of Germany | 174/76 |

Primary Examiner—Morris H. Nimmo
Attorney, Agent, or Firm—David M. Carter

[57] ABSTRACT

A device for insulating and re-insulating cable splices and terminations in which a housing encloses and defines a space around a portion of the cable to be insulated. An insulating gel fills the space. The insulating gel is formed of an imbibitive lightly crosslinked polymer having an insulating fluid such as mineral oil entrapped in the polymer network thereof. The polymer before it combines with the oil is granular, in the form of a multiplicity of imbiber beads. The imbiber beads may be formed of a styrene or alkylstyrene polymer.

8 Claims, 1 Drawing Sheet

U.S. Patent   Jul. 24, 1990   4,943,685
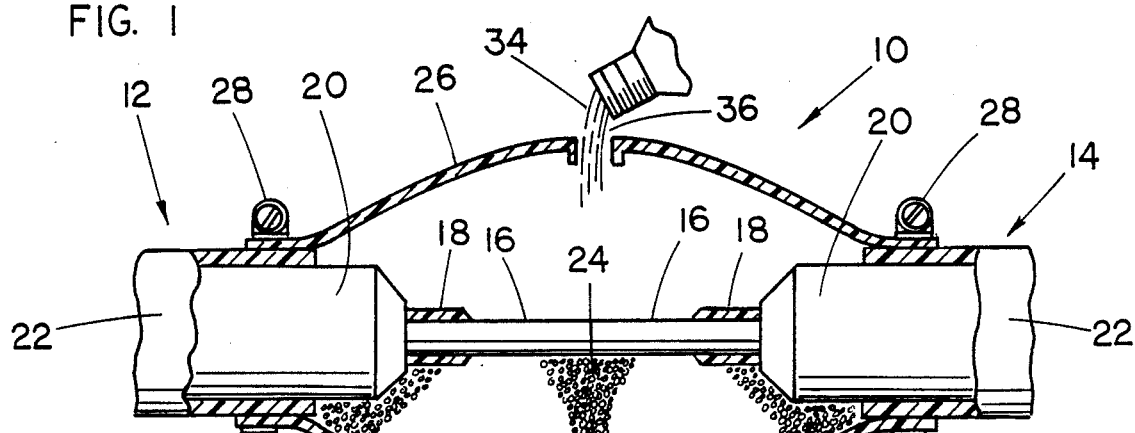
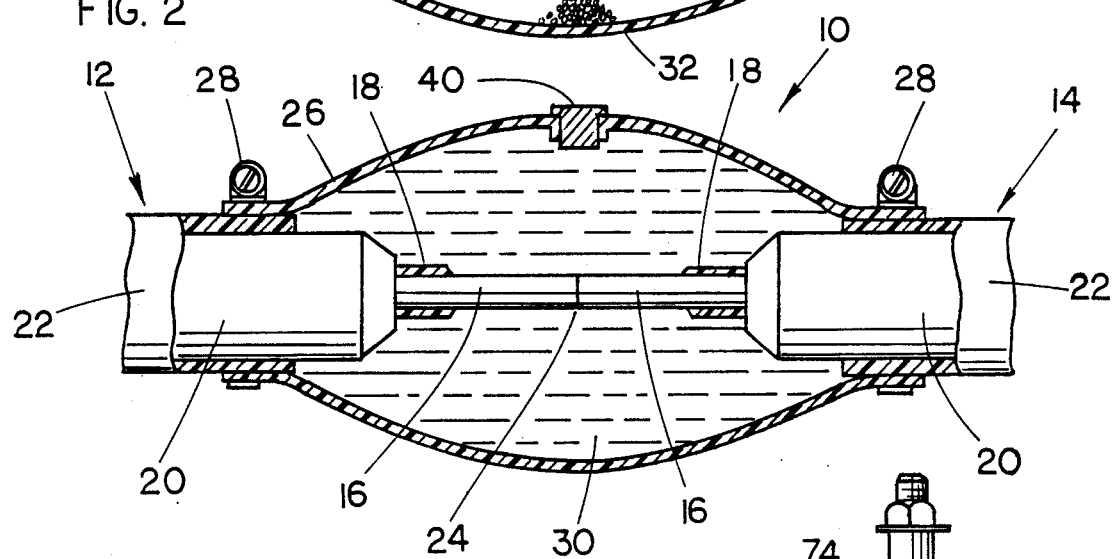
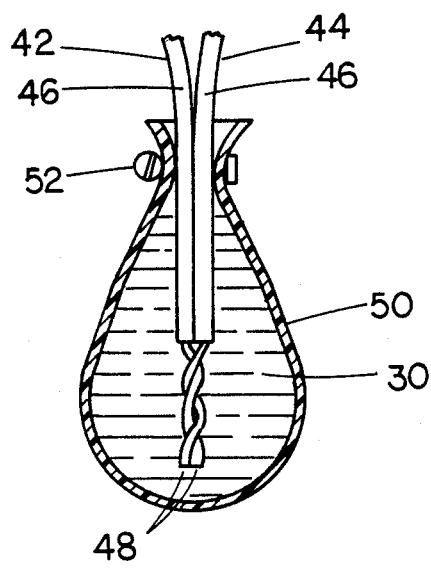
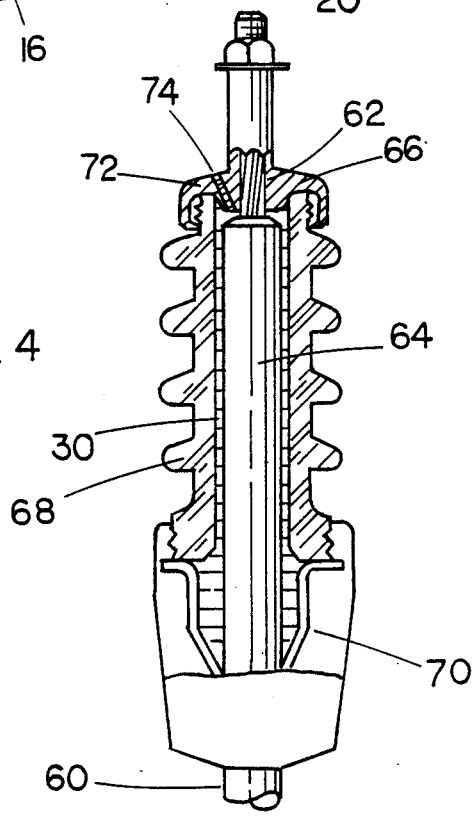

CABLE SPLICING AND TERMINATION SYSTEM

BACKGROUND OF THE INVENTION

This invention relates generally to an electric cable system and refers more particularly to a means for re-insulating cable splices and terminations.

High voltage cables used to transmit electric power, and also cables used for low voltage purposes, often require splicing either during installation or when repaired. Insulation or re-insulation of the splice is necessary. Terminations also require that they be insulated when installed or re-insulated at some later time as when repairs are necessary.

In the past, splices and terminations have sometimes been re-insulated with tape. The application of tape is time-consuming and moreover such re-insulation is particularly susceptible to moisture and has a high failure rate when installed underground, especially in the presence of water. Re-insulation by means of a continuous polymer mold has been employed, but requires the use of external heat to achieve the curing or vulcanizing process. A solid dielectric structure is formed that must be bonded to the insulation of the cable to form a moisture barrier and prevent air void formation during electrical load cycling. Such a bond is subject to failure due to expansion and contraction in response to changes in temperature. Two-part epoxy systems have also been used but during thermal cycling and due to expansion and contractions of the bond to the cable, the insulation and the case is often destroyed, creating air space and sites for moisture condensation to form.

OBJECTS OF THE INVENTION

It is one object of this invention to provide an improved system for insulating cable splices and terminations.

SUMMARY OF THE INVENTION

The electric cable system of this invention provides insulating means which comprises a housing enclosing and sealing a portion of the cable to be insulated and defining a space within the housing around the cable. An insulating gel substantially completely fills the space. The gel is formed of an imbibitive, lightly cross-linked polymer having an insulating fluid such as oil entrapped in the polymer network. The polymer before it is combined with the oil is preferably granular, in the form of a multiplicity of tiny beads.

The imbiber beads used to form the gel, because of the crosslinking, display unusual behavior with organic solvents, as is well known. Although plastics ordinarily dissolve in an appropriate solvent, these imbiber beads do not dissolve. Instead they entrap the solvent in the polymer network, swelling to a substantially larger size. The beads lose their granular identity in the gel that forms. These beads have such a capacity for entrapping oil that they will capture and contain up to 2.7 volumes of solvent (oil) for each bead volume.

The formation of the gel within the housing surrounding the cable substantially completely fills the available space and eliminates all pockets or voids where water or impurities might otherwise collect. The resulting gel has the unusual property of sticking tenaciously to cable splice materials and it is believed that the resulting bond cannot be fractured during expansion and contraction. The gel also has the ability to compress or expand during periods of expansion and contraction due to load cycling. More rigid conventional potting materials do not have this ability and do not readily adhere to the cable and splice case materials when subjected to extremely high mechanical stress. In addition, most conventional potting materials have weak adhesion to common cable splice materials such as polyethylene and Teflon. The gel described herein demonstrates strong adhesion to all cable splice materials.

These and other objects of the invention will become more apparent as the description proceeds, especially when considered with the accompanying drawings.

BRIEF DESCRIPTION OF THE DRAWINGS

FIG. 1 is a longitudinal sectional view of a housing enclosing and sealing a cable splice in a high voltage cable system. There are imbiber beads in the bottom portion of the space defined within the housing, and oil is shown being poured into the housing through a suitable opening.

FIG. 2 is similar to FIG. 1 but shows the spaced within the housing completely filled with an insulating gel formed by the interaction of the imbiber beads and oil.

FIG. 3 is a sectional view showing an application of the invention to a low voltage cable system of the termination type.

FIG. 4 is a sectional view showing the invention applied to a high voltage termination.

DETAILED DESCRIPTION

Referring now more particularly to the drawings and especially to FIGS. 1 and 2, the cable system there shown is a signal cable having a cable splice 10 formed of two cable sections 12 and 14.

Each cable section has a conductor 16, a semi-conducting strand screen 18 surrounding the conductor, and insulation 20 surrounding the strand screen. A tubular metal sheath 22 surrounds the insulation 20.

The cable sections 12 and 14 to be joined are stripped clean at the ends for a sufficient length to allow for adequate handling. Thus, the sheath 22, insulation 20 and strand screen 18 of each cable section are cut back as indicated, and the conductor ends are joined at 24 by using a conventional crimping device or by welding with a fusible alloy, for example.

A tubular shell or housing member 26 is applied over the stripped ends of the cable sections with the ends of the housing member clamped to the sheaths 22 of the cable sections by any suitable means as by simple hose claims 28, for example. The housing member 26 may be a simple flexible bag formed of polyethylene or like material, or, if the cable splices is to be installed underground or subjected to other physical stress, it may be of a heavier, rigid material such as stainless steel. The housing member defines a space around the splice which is filled with a suitable potting compound 30.

The potting compound 30 consists of an insulating gel which completely fills the space within the housing around the splice. The gel is formed of an imbibitive lightly crosslinked polymer combined with oil.

The polymer may be a styrene or alkylstyrene polymer and initially is granular, that is in the form of a multiplicity of tiny beads 32, having a grain size more or less like ordinary table salt. One suitable polymer is known as Imbiber Beads and is commercially available from EMCO.

The insulating fluid 34 is preferably an oil, such as a low viscosity transformer oil, vegetable oil, or other organic solvent.

In order to form the insulating gel 30, the imbiber beads 32 are introduced into the space within the housing through a suitable opening 36, after which the oil 34 is poured through the opening. Alternatively, the beads and oil may be premixed and the resulting gel is poured into the housing. The oil and imbiber beads quickly and spontaneously combine or interact without any application of heat or other procedure to form the insulating gel. The imbiber beads drink up and entrap the oil in the polymer network of the beads, swelling to completely fill the space within the housing. The beads lose their granular identity in the gel that forms. Any pockets or voids where water or other impurities might collect are completely eliminated by the expansion of the gel. After introduction of the imbiber beads and oil and the formation and expansion of the insulating gel, the opening 36 is sealed by a suitable closure 40.

FIG. 3 shows an application of the invention to a low voltage cable system of the termination type in which the cables 42 and 44 are stripped of insulation 46 covering the conductor ends 48, and the conductor ends are joined in any suitable manner, as shown. A housing 50, in this instance an open flexible top bag, enclosures the spliced ends of the conductor and the neck of the bag is sealed around an insulated portion of the conductor by any suitable means such as the hose clamp 52. The imbiber beads and oil may be introduced into the space defined within the housing through the neck of the bag before it is sealed by the hose clamp, or through a suitable opening (not shown) in a wall of the bag which, of course, would thereafter be closed by a stopper or the like after introduction of the oil and beads. The oil and beads interact as described above in connection with the description of FIGS. 1 and 2 to completely eliminate all voids in the space within the bag. The clamping pressure of the hose clamp may be relaxed slightly during the expansion and formation of the insulating gel to allow for the escape of air, and after the gel has fully expanded the hose clamp will be sealed tight.

FIG. 4 shows the invention applied to a high voltage termination. The cable 60 comprises a conductor 62 covered by insulation 64, the insulation 64 being stripped from the end of the conductor which is shown in contact with the terminal connector 66. A tubular insulator 68 of porcelain or the like surrounds the cable in spaced relation thereto, and together with the jacket 70 and terminal connector 66 form a closed chamber or space into which the imbiber beads and oil may be introduced through opening 72 to form the insulating gel in the manner previously described. The opening 72, after formation and expansion of the gel, may be sealed by a suitable plug 74.

This invention is applicable to all types of cable and compatible with all commonly used insulation materials. It not only has practical application to low voltage signal cable including fiber optic type cable, but also to high voltage electrical power transmission type cable. The outer housing may be as simple as a polyethylene or polyvinyl chloride plastic bag where mechanical strength is not required, or may be constructed of a rigid material where mechanical protection and strength is required as for example in certain submarine cable installations.

The preferred ratio by volume in each of the embodiments described herein of oil to beads is 1.5 to 1. However, the ratio by volume of oil to beads may be in the range of from about 0.375 to 1 to about 2.7 to 1 and still provide acceptable imbibing action.

The insulating gel 30 employed has the following advantages:

1. It has outstanding dielectric properties.
2. The swelling that takes place when the imbiber beads and oil combine completely eliminates voids. Voids are a problem in many other commercial re-insulation media and are sites for initiation of corona and where moisture and contamination can become trapped.
3. The insulating gel has very high hydrophobic properties which keeps water from entering the electrical connections.
4. The insulating gel of this invention provides an intimate adhesion to all materials used in known cable systems, including Teflon and grease coated conductors, but can be separated or stripped away with relative ease, permitting the splices and terminations to be re-entered when necessary.
5. No particular tools or skills are necessary to complete the re-insulation of a splice or termination.
6. The solid imbiber beads hold the splice concentric within the housing (see FIG. 1), and the resulting insulating gel formed when oil is added expands into intimate contact with the housing and electrical connections. The resulting sealed integrity is unaffected by any subsequent expansion or contraction that results from thermal changes.
7. The beads themselves are non-toxic, do not give off heat during expansion, are relatively inert, and have a very long shelf life.

While this invention has practical application for all different cable types such as those used for control signals, telecommunication, power distribution and high voltage transmission, it is especially advantageous where such cables are buried and the splice or termination is underground. This is because of the superior moisture resistance of the insulating medium employed.

A further advantage of applicant's invention is that the insulation medium may be stripped away without damage to the splice or termination. This is particularly important in telecommunication industry where connections frequently have to be opened for connection changes or testing.

I claim:

1. A cable system comprising: at least one conductor, means for environmentally protecting a portion of said conductor including a housing enclosing said portion of said conductor to be protected and defining a space within said housing around said conductor, and a gel substantially completely filling said space, said gel being formed of an imbibitive lightly crosslinked polymer having a fluid entrapped in the polymer network thereof, said polymer being an alkylstyrene polymer.

2. A cable system as defined in claim 1 wherein said fluid is an insulating fluid and said insulating fluid is an oil.

3. A cable system as defined in claim 2 wherein said oil is a mineral oil.

4. A cable system as defined in claim 1 wherein said housing comprises a flexible bag.

5. A cable system as defined in claim 1 wherein said housing comprises a rigid shell.

6. A cable system comprising: at least one conductor; means for environmentally protecting a portion of said conductor including a housing enclosing said portion of said conductor to be protected and defining a space within said housing around said conductor, and a gel substantially completely filling said space; said gel being formed of an imbibitive lightly crosslinked polymer having fluid entrapped in the polymer network thereof, said polymer before being combined with said fluid is in the form of a multiplicity of beads.

7. A cable system as defined in claim 6 wherein said fluid is an oil and the ratio by volume of said oil to said beads is 1.5 to 1.

8. A cable system as defined in claim 6 wherein said fluid is an oil and the ratio by volume of said oil to said beads is in the range of from about 0.375 to 1 to about 2.7 to 1.

* * * * *